(12) United States Patent
Yoshida et al.

(10) Patent No.: US 6,447,127 B1
(45) Date of Patent: Sep. 10, 2002

(54) VEHICLE INNER MIRROR ASSEMBLY AND METHOD OF ASSEMBLY THEREOF

(75) Inventors: Shigeki Yoshida; Masatsugu Ohashi; Kazuyuki Noda; Yoshihiro Fujikawa, all of Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/717,255

(22) Filed: Nov. 22, 2000

(30) Foreign Application Priority Data

Nov. 25, 1999 (JP) ............................................. 11-334434

(51) Int. Cl.[7] ............................................... G02B 7/182
(52) U.S. Cl. ...................... 359/871; 359/872; 359/873; 359/874
(58) Field of Search ................................. 359/871, 872, 359/873, 874, 875, 876; 248/472, 475.1, 476, 477, 479

(56) References Cited

FOREIGN PATENT DOCUMENTS

| JP | 61-115748 | 7/1986 |
|---|---|---|
| JP | 3-19481 | 4/1991 |

*Primary Examiner*—Mohammad Sikder
(74) *Attorney, Agent, or Firm*—Nixon Peabody LLP; Thomas W. Cole

(57) ABSTRACT

A spring having four urging legs is fixed in a stay of a mirror, and retention pawls corresponding to the urging legs are formed at a base fixed within a passenger compartment of a vehicle. The urging legs engage with the retention pawls so that the stay is held at the base at a predetermined load. Because the four urging legs are provided on the spring, an urging force of the respective urging legs can be made small and bending of the urging legs is unobstructed by other members. Accordingly, when a load of predetermined value or greater acts upon the mirror, the urging legs corresponding to the direction in which the load acts slide and the engagement between all of the urging legs and the retention pawls is released. The mirror is allowed to fall regardless of the direction in which the load acts.

18 Claims, 13 Drawing Sheets

VEHICLE INNER MIRROR ASSEMBLY AND METHOD OF ASSEMBLY THEREOF

BACKGROUND OF THE INVENTION

1. Field of the Invention

The present invention relates to a vehicle inner mirror assembly provided within a passenger compartment of a vehicle, and to a method of assembling the vehicle inner mirror assembly.

2. Description of the Related Art

A conventional vehicle inner mirror assembly 50 is illustrated in FIG. 13. The vehicle inner mirror assembly 50 is provided with a base 52 formed in a box-like configuration opening at the vehicle front and lower side. The base 52 is fixed within the passenger compartment to a front windshield (not shown in the drawings), and a substantially U-shaped plate spring 54 is disposed at the interior of the base 52. The plate spring 54 has an urging force applied toward side walls of the base 52. In a state in which balls 56 are nipped between ends of the plate spring 54 and the side walls of the base 52 by the urging force, the plate spring 54 is held at the base 52. A base inner 58 is provided at an interior of the plate spring 54, and the base inner 58 is fixed by a bolt 64 to a stay 62 disposed at a rear view mirror 60. A nipping plate 66 is disposed at each end of the plate spring 54. By fixing the base inner 58 to the stay 62 as described above, the plate spring 54 is nipped at the nipping plates 66 between the base inner 58 and the stay 62.

In the vehicle inner mirror assembly 50, as described above, the base 52 holds the spring plate 54, and the plate spring 54 is nipped between the base inner 58 and the stay 62. The stay 62 (i.e., the inner mirror 60) is thereby held at the base 52.

Generally, in a vehicle inner mirror assembly, it is desirable that the mirror fall out when a load of predetermined value or more acts on the rear view mirror, regardless of the direction in which the load is applied.

Here, as described above, in the vehicle inner mirror assembly 50, when a load of predetermined value or more load acts on the mirror 60 in a longitudinal direction of the vehicle (or in a vertical direction of the vehicle), the plate spring 54 is deflected inwardly with the spring plate 54 coming out from the base 52, whereby the mirror 60 (i.e., the stay 62) drops out from the base 52.

However, in the vehicle inner mirror assembly 50, the stay 62 is supported at the base 52 only at the two points corresponding to the ends of the plate spring 54. In order to maintain for a predetermined load the force holding the stay 62 to the base 52 only at the two points which are the ends of the plate spring 54, the urging force of the plate spring 54 is made larger. Moreover, due to the ends of the plate spring 54 abutting the side walls of the base 52 and the base inner 58, twisting of the plate spring 54 is hindered. For this reason, when a load of predetermined value or more acts on the mirror 60 in a transverse direction of the vehicle, there has been the problem that it becomes difficult for the plate spring 54 to be released from the base 52 and, as a result, it becomes difficult for the mirror 60 (i.e., the stay 62) to fall from the base 52.

Further, when the vehicle inner mirror assembly 50 is assembled, the plate spring 54, the balls 56 and the base inner 58 are aligned at predetermined positions within the base 52. The base inner 58 must be fixed to the stay 62 by fastening the bolt 64 and maintaining this state. In this manner, there has been a problem in that not only does the assembly operation become troublesome because the balls 56 and the base inner 58 are necessary, the number of parts increases, many parts must be aligned and the bolt 64 must be fastened, but a lot of time must be expended for assembly. As a result, overall assembly is poor and costs escalate.

SUMMARY OF THE INVENTION

Taking the above facts into consideration, an object of the present invention is to obtain a vehicle inner mirror assembly in which, when a load of predetermined value or greater acts on a mirror, the mirror can fall regardless of the direction in which the load acts.

A first aspect of the present invention is a mirror assembly for fastening to the interior of a vehicle, the mirror assembly comprising: a mirror; a stay supporting the mirror; a base fastenable to the interior of a vehicle, the base having at least three lugs; and a retention member connected to the stay, the retention member having at least three legs engageable with the lugs of the base for mounting the stay to the base.

A second aspect of the present invention is a mirror assembly for fastening to the interior of a vehicle, the mirror assembly comprising: a rear view mirror; a stay provided at the mirror; a base fixable to the interior of a vehicle; retention lugs provided at the base; and a retention member fixed to the stay, the retention member having at least three resiliently deformable legs, each leg extending at a substantially equal interval from around the retention member and being engageable with a corresponding lug, the legs being resiliently deformed and pressing against the lugs when engaged with the lugs for maintaining engagement therewith up to a load of a predetermined value.

According to the vehicle inner mirror assembly of the first and second aspects of the present invention, the urging legs of the retention member fixed to the stay engage by an urging force with the retention lugs provided on the base, whereby the stay (i.e., the mirror) is held at the base at a load of predetermined value.

Here, because at least three urging legs are provided on the retention member, the stay is supported at the base at at least three points. Accordingly, there is no need to increase the urging force of the urging legs to the extent necessary with conventional plate springs in order to maintain the force at which the stay is held at the base for a load of predetermined value. Moreover, bending of the urging legs is unobstructed by other members.

Consequently, when a load of predetermined value or greater acts on the mirror, at least one of the urging legs corresponding to the direction in which the load acts slides toward the stay from the base, whereby the engagement between all of the urging legs and the retention lugs is released. As a result, the mirror (i.e., the stay) is allowed to fall from the base regardless of the direction in which the load acts.

Further, when the vehicle rear view mirror assembly is assembled, the stay (i.e., the mirror) is held at the base by the urging legs engaging with the retention lugs of the base in a state in which the urging legs of the retention member are elastically deformed. As a result, conventional balls and the base inner become unnecessary, the number of parts can be reduced, and the need to align many parts and fasten them with a bolt is eliminated so that assembly operations can be conducted easily and assembly time can be shortened. Hence, overall assembly can be improved and costs can be reduced.

A third aspect of the present invention a method for assembling a mirror assembly, comprising the steps of:

providing a retention member having legs; providing a base having at least one opening with lugs disposed therein, engageable with the retention member legs; inserting the retention member legs into the opening and rotating until the legs engage with the lugs; and fixing the retention member to a stay for supporting a mirror.

DESCRIPTION OF THE PREFERRED EMBODIMENTS

First Embodiment

Figure 1:
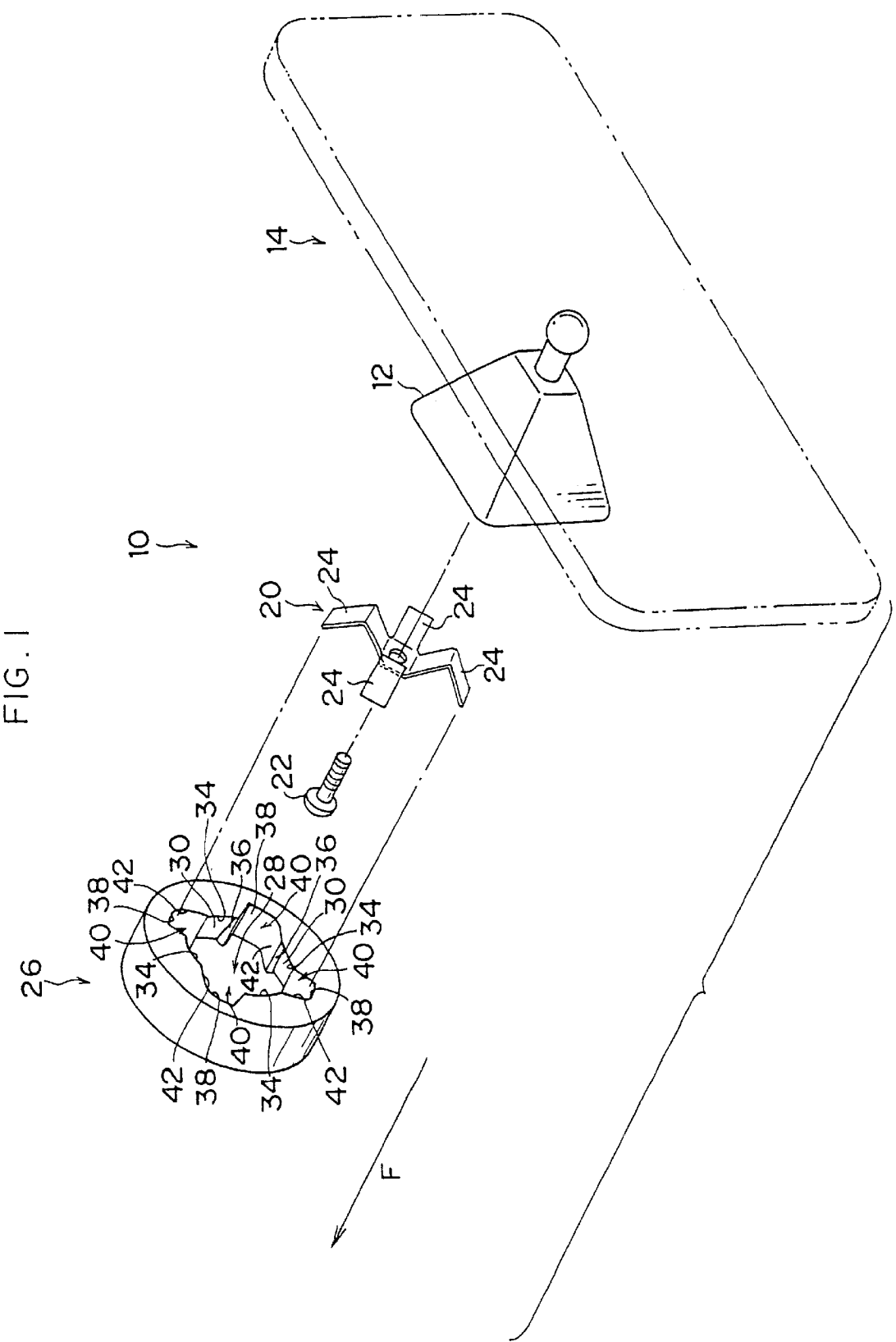
FIG. 1 is an exploded perspective view of a vehicle inner mirror assembly pertaining to a first embodiment of the present invention.
Figure 2:
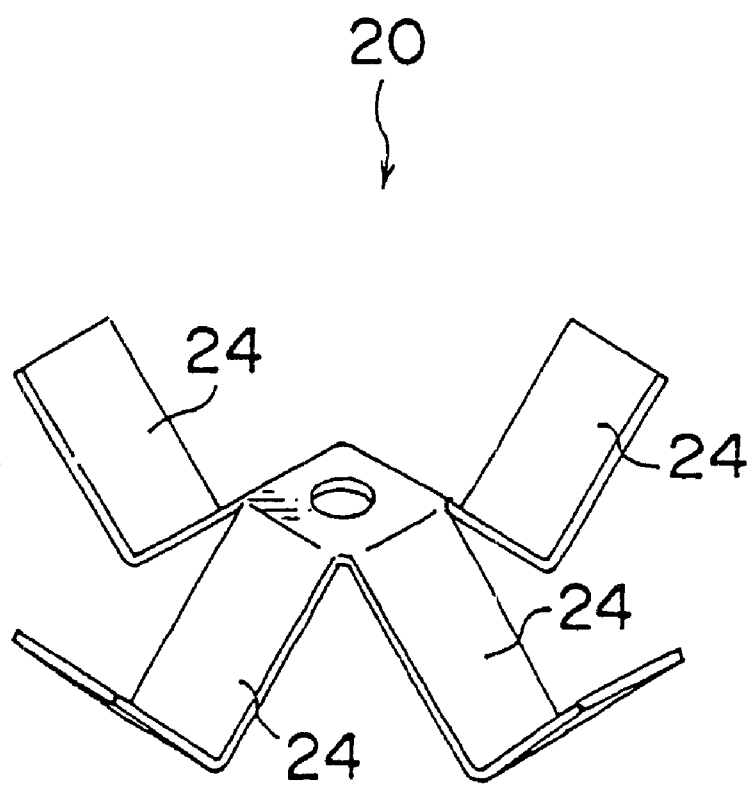
FIG. 2 is a perspective view of a spring of the vehicle inner mirror assembly pertaining to the first embodiment of the present invention.
Figure 3:
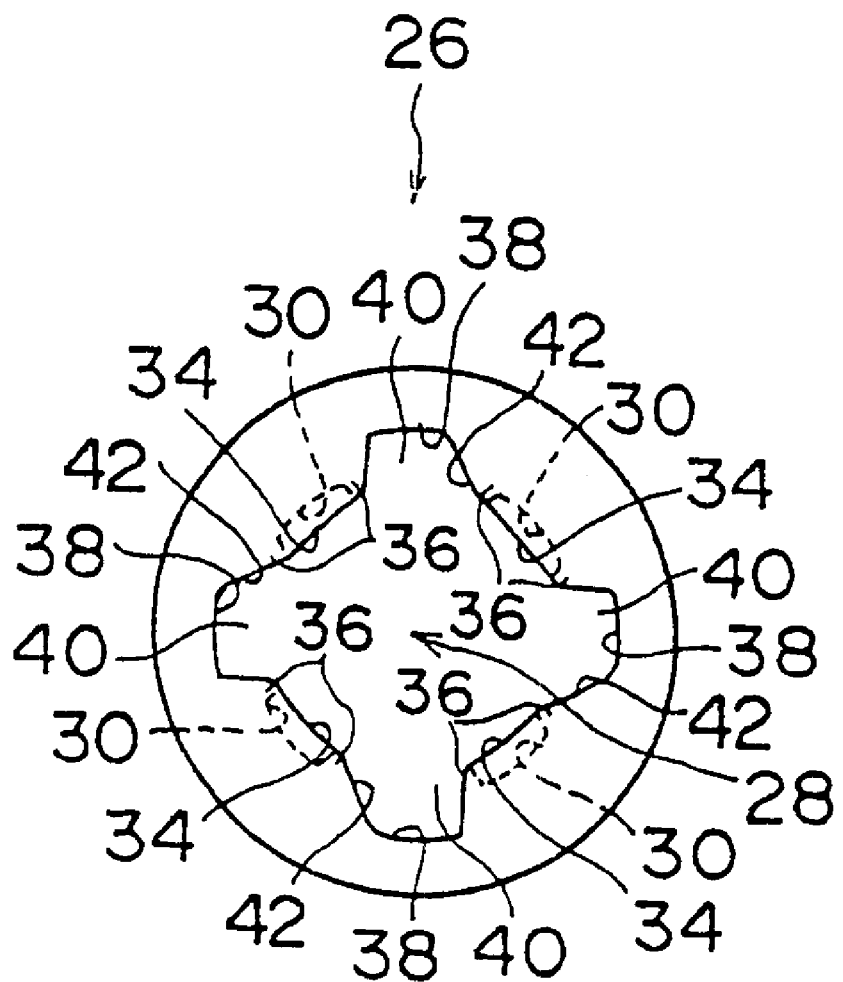
FIG. 3 is a plan view of a base of the vehicle inner mirror assembly pertaining to the first embodiment of the present invention.
Figure 4:
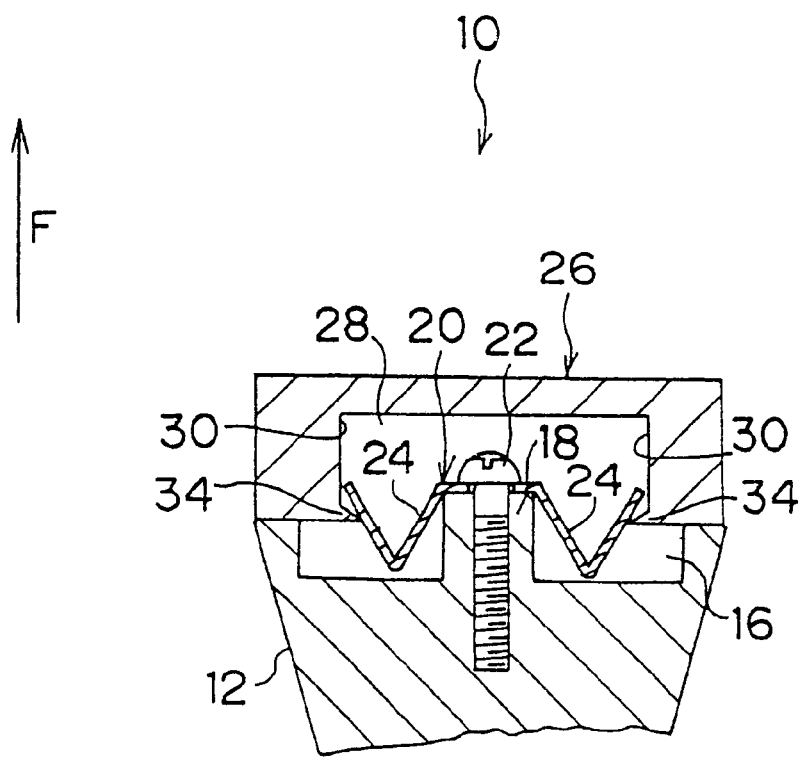
FIG. 4 is a cross-sectional view of main parts of the vehicle inner mirror assembly pertaining to the first embodiment of the present invention.

In FIG. 1, a vehicle inner mirror assembly 10 pertaining to a first embodiment of the present invention is illustrated in an exploded perspective view. In FIG. 2, a main part of the vehicle inner mirror assembly 10 is illustrated in a perspective view. In FIG. 3, main parts of the vehicle inner mirror assembly 10 are illustrated in a plan view. In FIG. 4, main parts of the vehicle inner mirror assembly 10 are illustrated in a cross-sectional view.

As illustrated in FIG. 1, the vehicle inner mirror assembly 10 pertaining to the first embodiment of the present invention is provided with a rear view mirror 14. A stay 12 is disposed on the mirror 14 at a side thereof facing the front of the vehicle (the direction of arrow F). As illustrated in FIG. 4, a center-hollow portion 16 is formed in the stay 12 at a side thereof facing the front of the vehicle (the direction of arrow F). A fixing lug 18 which protrudes in the direction of the front of the vehicle is formed at a central portion of the center-hollow portion 16.

A spring 20 is disposed as a retention member in the center-hollow portion 16 of the stay 12. The center of the spring 20 is fixed to the fixing lug 18 by a screw 22, whereby the spring 20 is fixed to the stay 12. As illustrated in FIGS. 1 and 2, the spring 20 is formed of an elastic material in a substantially cross-shaped configuration when seen in plan view, and four urging legs 24 are provided at equal intervals in a circumferential direction of the spring 20. Each urging leg 24 bends in the direction of the vehicle rear (i.e., opposite the direction of arrow F) from the substantially square outer periphery of the center of the spring 20, and then bends in the direction of the vehicle front (i.e., in the direction of arrow F) at a substantially central portion of the respective urging leg 24 to form a V-shaped configuration. Each respective urging leg 24 thereby has an urging force toward the peripheral direction of the center-hollow portion 16 of the stay 12. Further, as previously described, by the substantially central portions of the urging legs 24 bending in a V-shaped configuration, the urging force of the urging legs 24 is doubled compared to a case in which the substantially center portions of the urging legs 24 are not bent.

As illustrated in FIG. 1, a base 26 is provided at the stay 12 in the vehicle front direction thereof (i.e., in the direction of arrow F). The base 26 is formed in a substantially cylindrical shape, and the wall surface of the vehicle front direction side of the base 26 is fixed within a passenger compartment of a vehicle to a front windshield (not shown in the drawings). As illustrated in FIGS. 3 and 4, a substantially cylindrical center-hollow portion forms a recess 28 in the base 26. The recess 28 opens to the vehicle rear direction of the base 26.

A plurality (four in the present embodiment) of retention walls 30 is formed at the peripheral wall of the recess 28, and the retention walls 30 correspond to respective urging legs 24 of the spring 20. Retention pawls 34 are formed as retention lugs at vehicle rear direction ends of the retention walls 30, and the retention pawls 34 project inwardly toward the recess 28. The urging legs 24 of the spring 20 engage with the retention pawls 34 by an urging force, whereby the stay 12 (i.e., the mirror 14) is held at a predetermined load at the base 12. Further, the urging legs 24 make line contact with the retention pawls 34, whereby the urging force of the urging legs 24 applied to the retention pawls 34 is stabilized at a constant value.

As illustrated in FIGS. 1 and 3, a stopper 36 is formed at each end in the base 26 circumferential direction of the respective retention pawls 34 (i.e., at each end of the respective retention pawls 34). The stoppers 36 project from the wall surfaces of the retention walls 30 toward the base 26 center and adjoin the urging legs 24 of the spring 20, whereby sliding of the urging legs 24 toward the spring 20 circumferential direction is stopped.

Figure 5:
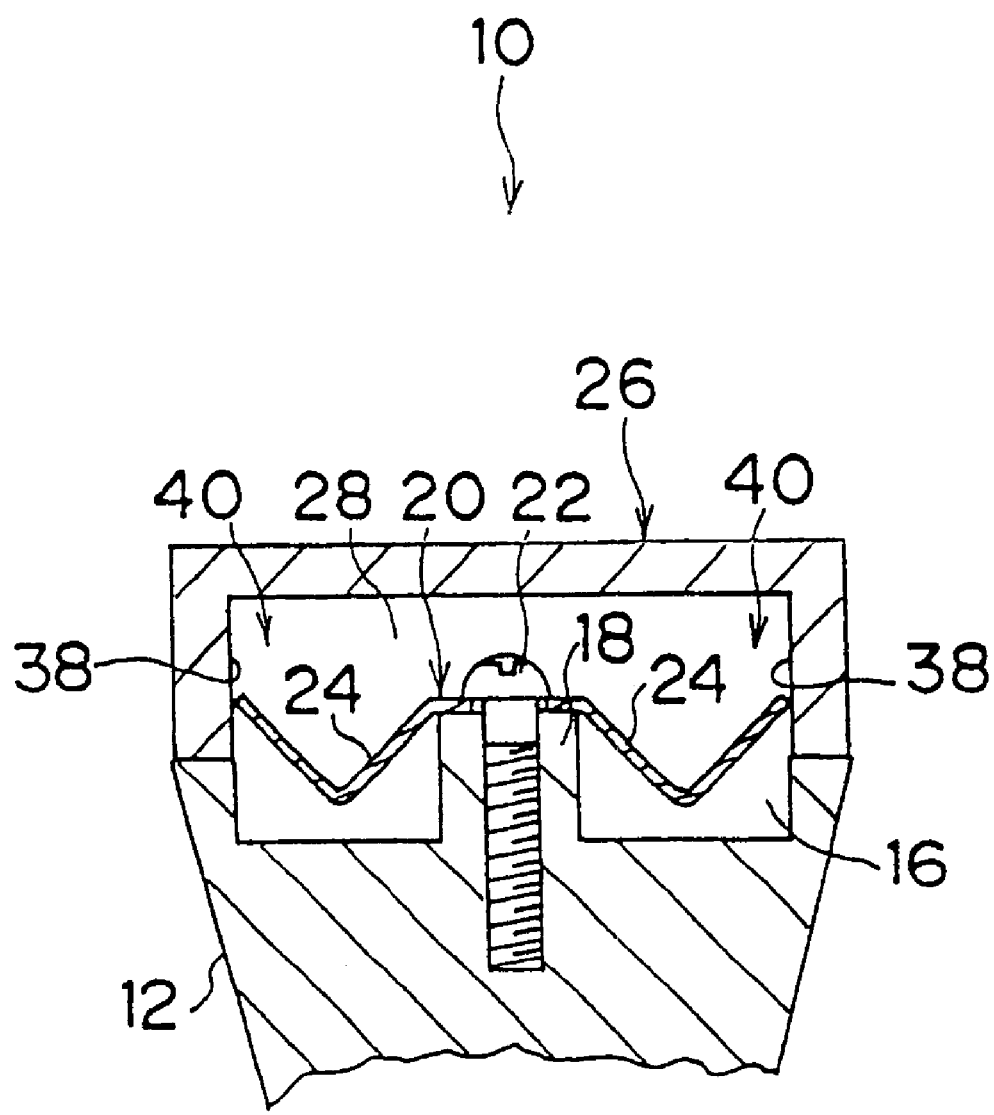
FIG. 5 is a cross-sectional view at the time of assembly of the vehicle inner mirror assembly according to the first embodiment of the present invention.

A plurality (four in the present embodiment) of insertion walls 38 is formed at the peripheral wall of the center-hollow recess 28, and a plurality (four in the present embodiment) of insertion holes 40 is formed by the insertion walls 38. The insertion walls 38 adjoin the retention walls 30 (i.e., the retention pawls 34) and are disposed closer to the outer periphery of the base 26 than the retention walls 30. Accordingly, respective insertion holes 40 are corresponded to respective urging legs 24 of the spring 20, thereby enabling the urging legs 24 to be inserted as they are into respective insertion holes 40 in a natural state in which the urging force is not generated. Further, inclined guiding portions 42 are formed at positions where respective insertion holes 40 and retention pawls 34 adjoin. The inclined guiding portions 42 incline toward the retention pawls 34 from the insertion holes 40 (i.e., the insertion walls 38). For this reason, as illustrated in FIG. 5, after the urging legs 24 have been inserted as they are into the insertion holes 40 in a natural state in which the urging force is not generated, the stay 12 (i.e., the spring 20) is rotated with respect to the base 26 and the urging legs 24 are slid along the inclined guiding portions 42 until they engage with the retention pawls 34. Consequently, as illustrated in FIG. 4, the urging legs 24 are elastically deformed (inwardly pressured) by the inclined guiding portions 42 whereby the urging legs 24 engage with the retention pawls 34.

Figure 6:
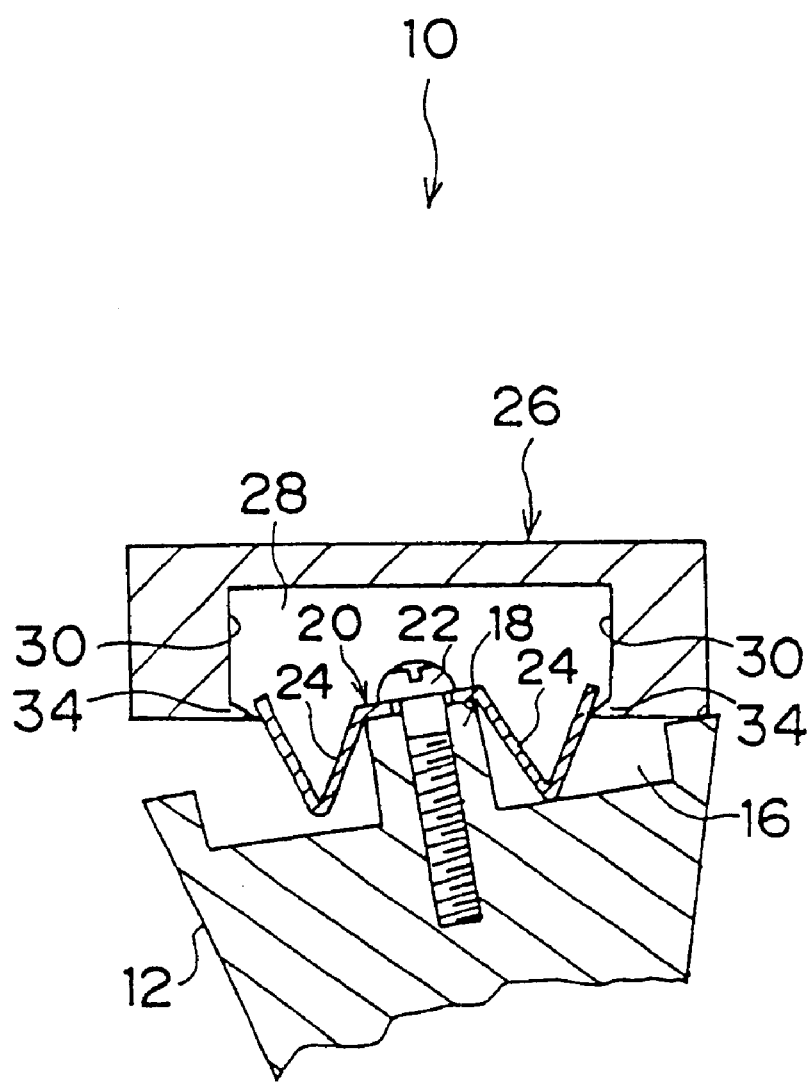
FIG. 6 is a cross-sectional view at the time the mirror (i.e., a stay) falls from the base in the vehicle inner mirror assembly of the first embodiment of the present invention.

Here, as illustrated in FIG. 6, when a load of predetermined value or greater acts on the mirror 14, at least one of the urging legs 24 corresponding to the direction in which the load acts slides along the retention walls 30 of the base 26 in the direction of the stay 12 from the base 26, whereby the engagement between each of the urging legs 24 and the retention pawls 34 is released. As a result, regardless of the direction in which a load acts, the mirror 14 (i.e., the stay 12) falls from the base 26.

Operation of the invention according to the present embodiment will hereinafter be described.

As illustrated in FIG. 4, in a vehicle inner mirror assembly 10 having the structure described above, the urging legs 24 of the spring 20 fixed to the stay 12 engage with the retention pawls 34 formed on the retention walls 30 of the base 26. The stay 12 (i.e., the mirror 14) is thereby retained at a load of predetermined value at the base 26.

Here, because the substantially central portion of each urging leg 24 of the spring 20 is bent, the urging force of the urging legs 24 can be doubled in comparison to a case in which the substantially central portions of the same are not bent. Therefore, the force at which the stay 12 is held at the base 26 can be easily set for a predetermined load. Moreover, since the proximal ends (i.e., portions nearest the center of the spring 20) and substantially central portions of the urging legs 24 are bent, the space occupied by the urging legs can be made small. As a result, the base 26 and the stay 12 can be spatially economized.

Because four urging legs 24 are provided on the spring 20, the stay 12 is supported at the base 26 at four points. Accordingly, there is no need to increase the urging force of the urging legs 24 to the extent necessary with conventional plate springs in order to maintain the force at which the stay 12 is held at the base 26 for a load of predetermined value. Moreover, the bending of the urging legs 24 is not obstructed by other members. As a result, as illustrated in FIG. 6, when a load of predetermined value or greater acts upon the mirror 14, at least one of the urging legs 24 corresponding to the direction in which the load acts slides along the retention walls 30 of the base 26 in the direction of the stay 12 from the base 26, whereby the engagement between each of the urging legs 24 and the retention pawls 34 is released. As a result, regardless of the direction in which a load acts, the mirror 14 (i.e., the stay 12) is allowed to fall from the base 26.

Further, because the urging legs 24 may easily be bent at a bending position thereof (i.e., proximal ends and substantially central portions of the urging legs 24), the mirror 14 (i.e., the stay 12) is easily allowed to fall from the base 26.

Because the urging legs 24 of the spring 20 make line contact with the retention pawls 34 of the base 26, the urging force of the urging legs 24 applied to the retention pawls 34 can be stabilized at a constant value. Accordingly, the force at which the stay 12 is held at the base 26 may be stabilized for a predetermined load, and when a load of predetermined value or greater acts on the mirror 14, the mirror 14 (i.e., the stay 12) is reliably allowed to fall out from the base 26.

Further still, because the stoppers 36 provided at ends of the retention pawls 34 stop the urging legs 24 from sliding in the spring 20 circumferential direction, slipping of the urging legs 24 from the retention pawls 34 toward the insertion holes 40 (i.e., the spring 20 circumferential direction) so that the engagement of the urging legs 24 with the retention pawls 34 is needlessly released can be prevented. Consequently, when a load of predetermined value or greater acts on the mirror 14, falling of the mirror 14 (i.e., the stay 12) from the base 26 can be prevented.

Here, as illustrated in FIG. 5, when the vehicle inner mirror assembly is assembled, after the urging legs 24 of the spring 20 have been inserted as they are into the insertion holes 40 adjacent to the retention pawls 34 of the base 26 in a natural state in which an urging force is not generated, the stay 12 (i.e., the spring 20) is rotated with respect to the base 26 and the urging legs 24 are slid along the inclined guiding portions 42 until they engage with the retention pawls 34. Consequently, in a state in which the urging legs 24 are elastically deformed (inwardly pressured) by the inclined guiding portions 42, the urging legs 24 engage with the retention pawls 34 and the stay 12 can be held at the base 26.

Hence, because conventional balls and a base inner become unnecessary, the number of parts can be reduced and the need to align many parts by fastening a bolt thereto is eliminated, assembly operations can be performed easily and assembly time can be reduced. Therefore, overall assembly can be improved and costs can be reduced.

Even when a procedure is not carried out in which the urging legs 24 are engaged with the retention lugs by manual operation in a state of elastic deformation, after the urging legs 24 are inserted as they are into the insertion holes 40 in a natural state in which an urging force is not generated, the urging legs 24 can be engaged with the retention pawls 34 since the urging legs 24 are elastically deformed (inwardly pressured) by the inclined guiding portions 42 by only rotating the stay 12 (i.e., the spring 20) with respect to the base 26. Because the urging legs 24 can be easily engaged with the retention pawls 34, assembly operations can be easily performed, assembly time can be further reduced, overall assembly can be improved and costs can be further reduced.

Furthermore, because the inclined guiding portions 42 provided at the positions where the insertion holes 40 and the retention pawls 34 adjoin incline toward the retention pawls 34 from the insertion holes 40, engagement of the urging legs 24 with the retention pawls 34 is guided by the inclined guiding portions 42. Accordingly, because the urging legs 24 can be easily engaged with the retention pawls 34, assembly operations can be performed even more easily, assembly time can be reduced even further, overall assembly can be improved even further and costs can be reduced even further.

Although the present embodiment describes a structure in which the urging legs 24 of the spring 20 engage with the retention pawls 34 of the base 26, the present invention is not limited to the same. A structure in which the urging legs 24 of the spring 20 engage (including a case in which line contact is made) with the retention walls 30 of the base 26 is also possible.

Second Embodiment

Figure 7:
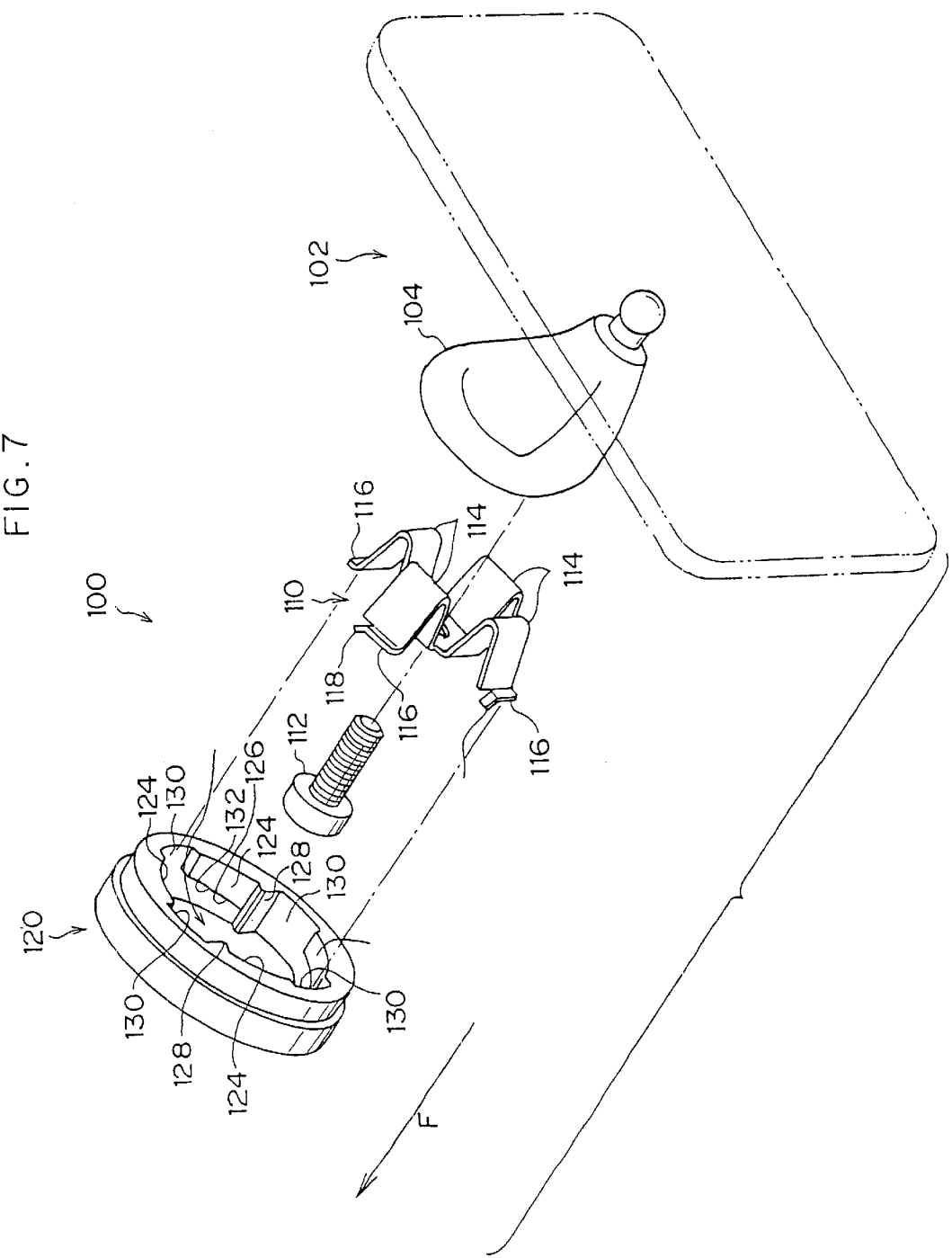
FIG. 7 is an exploded perspective view of a vehicle inner mirror assembly pertaining to a second embodiment of the present invention.
Figure 8:
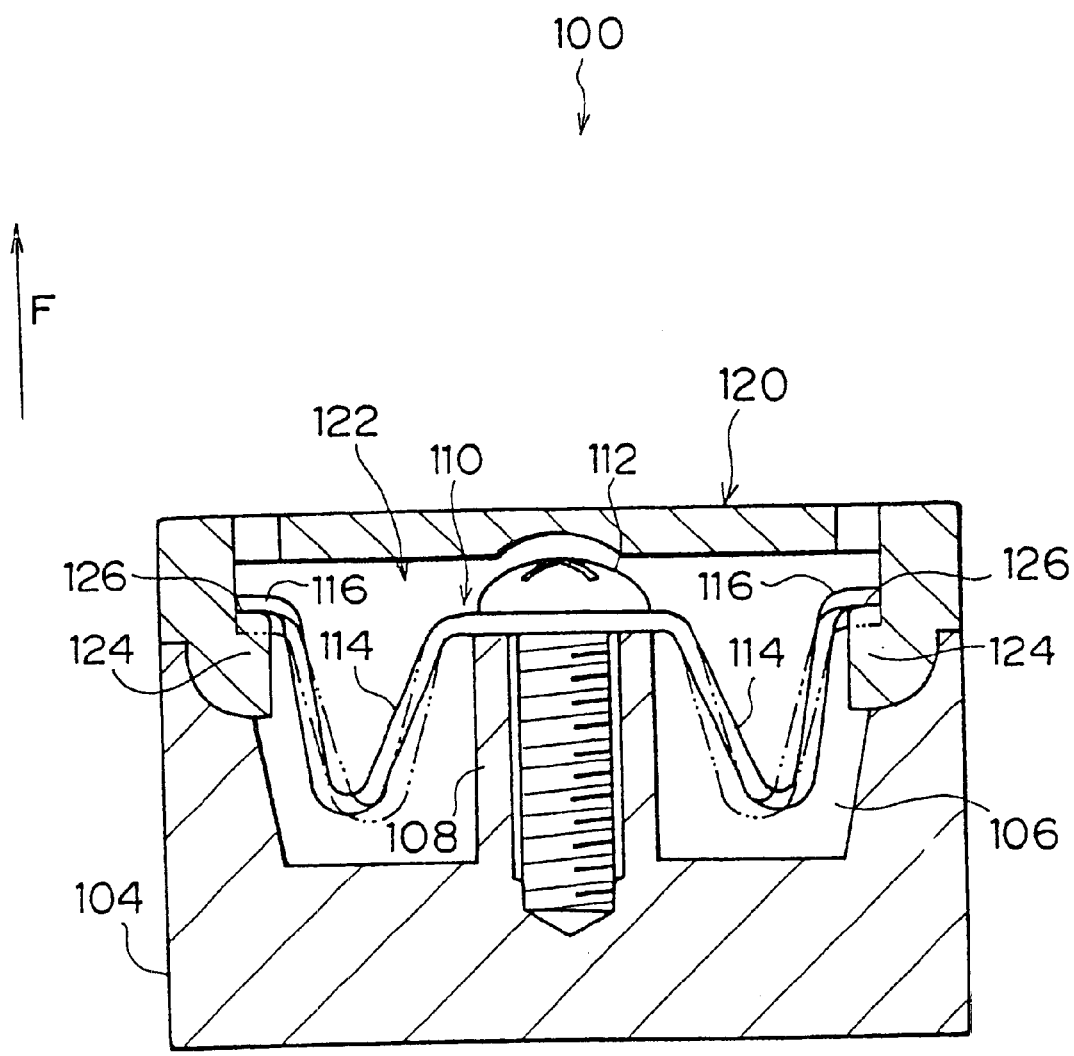
FIG. 8 is a cross-sectional view (taken along line 8—8 of FIG. 9A) of main parts of the vehicle inner mirror assembly pertaining to the second embodiment of the present invention.
Figure 9A:
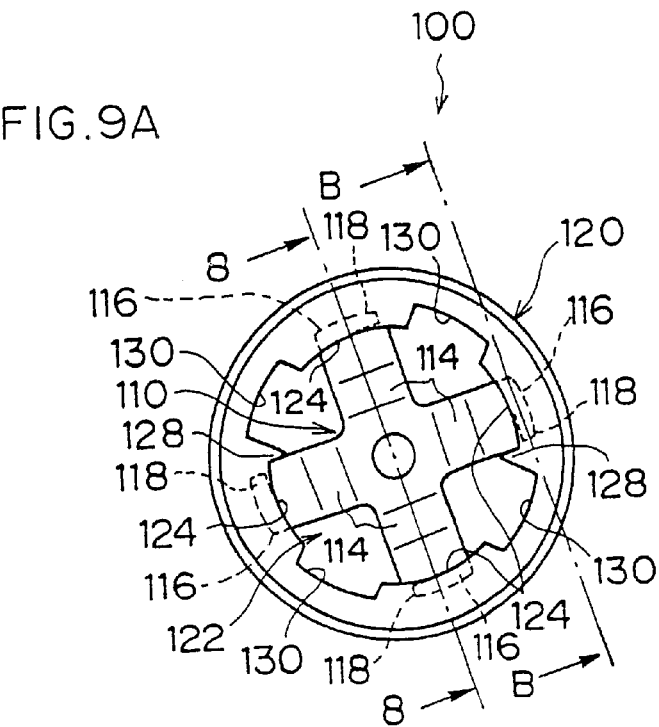
FIG. 9A is a plan view, as seen from the stay, of main parts of the vehicle inner mirror assembly pertaining to the second embodiment of the present invention.
Figure 9B:
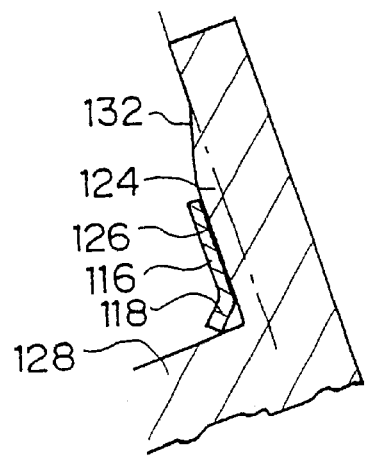
FIG. 9B is a cross-sectional view (taken along line B—B of FIG. 9A) of main parts of the vehicle inner mirror assembly pertaining to the second embodiment of the present invention.

In FIG. 7, a vehicle inner mirror assembly 100 according to a second embodiment of the present invention is illustrated in an exploded perspective view. In FIG. 8, main parts of the vehicle inner mirror assembly 100 are illustrated in a cross-sectional view. In FIG. 9A, main parts of the vehicle inner mirror assembly 100 are illustrated in a plan view, and in FIG. 9B, main parts of the vehicle inner mirror assembly 100 are illustrated in a cross-sectional view (taken along line B—B of FIG. 9A).

As illustrated in FIG. 7, the vehicle inner mirror assembly 100 according to the second embodiment of the present invention has a rear view mirror 102. A stay 104 is provided at a side of the mirror 102 toward the front of the vehicle (i.e., the direction of arrow F). As illustrated in FIG. 8, a center-hollow portion 106 is formed at a side of the stay 104 toward the front of the vehicle (i.e., the direction of arrow F). A fixing lug 108 which protrudes toward the front of the vehicle is provided at a central portion of the center-hollow portion 106.

As illustrated in FIG. 7, a spring 110 is provided as a retention member at the center-hollow portion 106 of the stay 104. The central portion of the spring 110 is fixed to the fixing lug 108 of the stay 104 by a screw 112, whereby the spring 110 is fixed to the stay 104. The spring 110 is formed of elastic material in a substantially cross shape when seen in plan view. Four urging legs 114 having an urging force are provided at equal intervals in the circumferential direction of the spring 110. Each urging leg 114 bends in the direction of the vehicle rear (i.e., opposite the direction of arrow F) from the substantially square outer periphery of the center of the spring 110, and then bends in the direction of the vehicle front (i.e., in the direction of arrow F) at a substantially central portion of the respective urging leg 114 to form a V-shaped configuration. Accordingly, the urging force of the urging legs 114 is doubled in comparison with a case in which the substantially center portions of the urging legs 114 are not bent. A contact portion 116 is provided at the distal end tip of each respective urging leg 114, and the contact portions 116 are orthogonal to the direction facing the base 120 from the stay 104.

A guide taper 118 is formed at one side of each spring 110 circumferential direction end of the contact portions 116. The guide tapers 118 are curved with respect to the contact portions 116, and slant parallel to the direction facing receiving portions 126 of the retention lugs 124 from insertion holes 130 of the base 120.

A base 120 is provided at the stay 104 in the vehicle front direction thereof. The base 120 is formed in a substantially cylindrical shape, and the wall surface of the vehicle front direction side of the base 120 is fixed within a passenger compartment of a vehicle to a front windshield (not shown in the drawings). A substantially cylindrical portion forms a recess 122 in the base 120. The recess 122 opens to the vehicle rear direction of the base 120.

A plurality (four in the present embodiment) of retention lugs 124 is formed at a peripheral wall of the recess 122, and the retention lugs 124 project toward the recess 122 inner side. Further, a receiving portion 126 is formed at the vehicle front direction side of each retention lug 124. The receiving portions 126 are orthogonal to the direction facing the stay 104 from the base 120 with respect to the contact portions 116. Because the contact portions 116 make surface contact with the receiving portions 126, the urging legs 114 of the spring 110 engage with the retention lugs 124 by an urging force. Accordingly, because the stay 104 is urged in the direction facing the base 120 by the urging force of the urging legs 114, the stay 104 (i.e., the mirror 102) is held at a predetermined load at the base 120 and the stay 104 is pressured to the base 120.

A stopper 128 (a total of two in the present embodiment) is formed at each end in the base 120 circumferential direction (i.e., the spring 110 circumferential direction) of the retention lugs 124 (i.e., the receiving portions 126). The stoppers 128 project toward the base 120 center from the retention lugs 124 and adjoin the urging legs 114 of the spring 110, whereby sliding of the urging legs 114 in the spring 110 circumferential direction is stopped.

Figure 10:
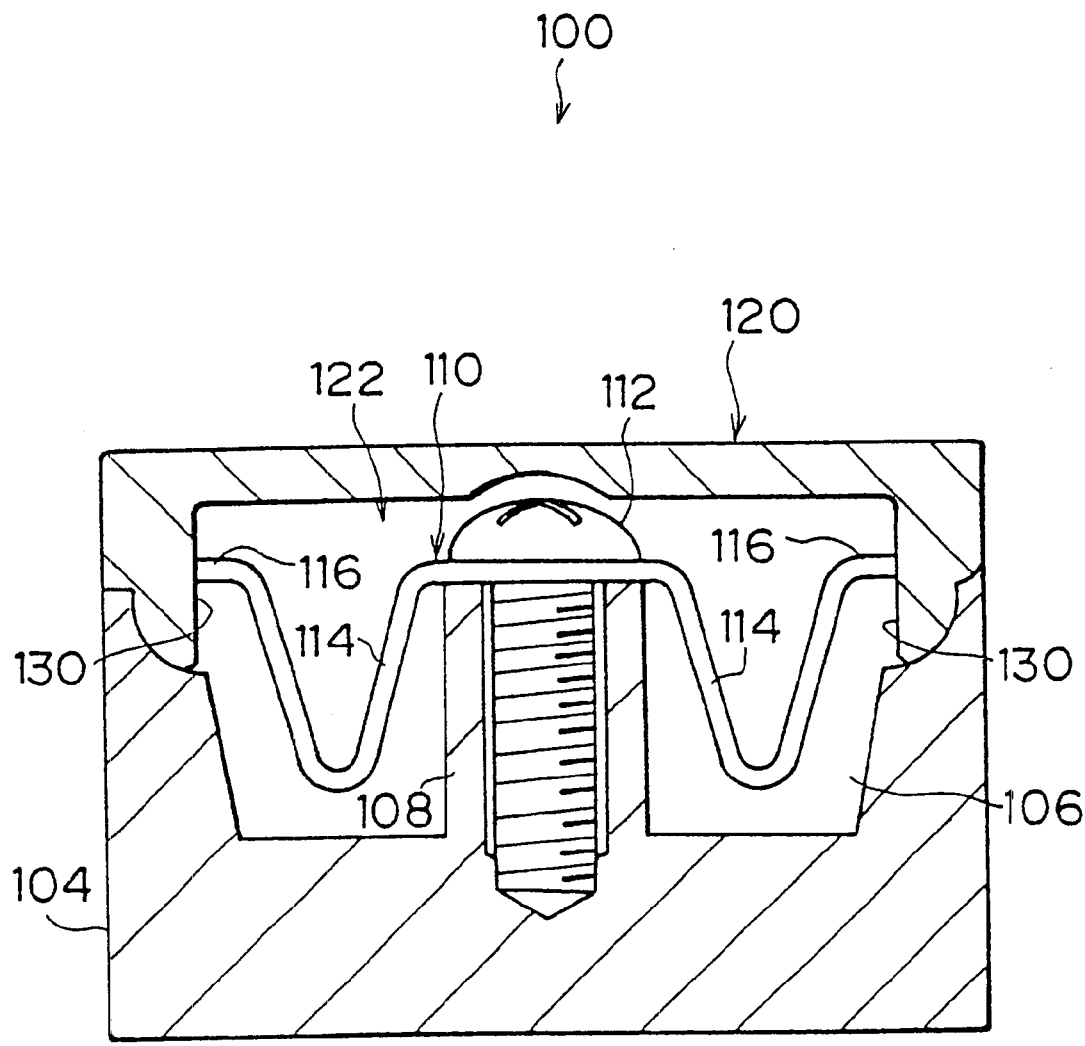
FIG. 10 is a cross-sectional view (taken along line 10—10 of FIG. 11A) at the time a stay is inserted into a base in the vehicle inner mirror assembly pertaining to the second embodiment of the present invention.
Figure 11A:
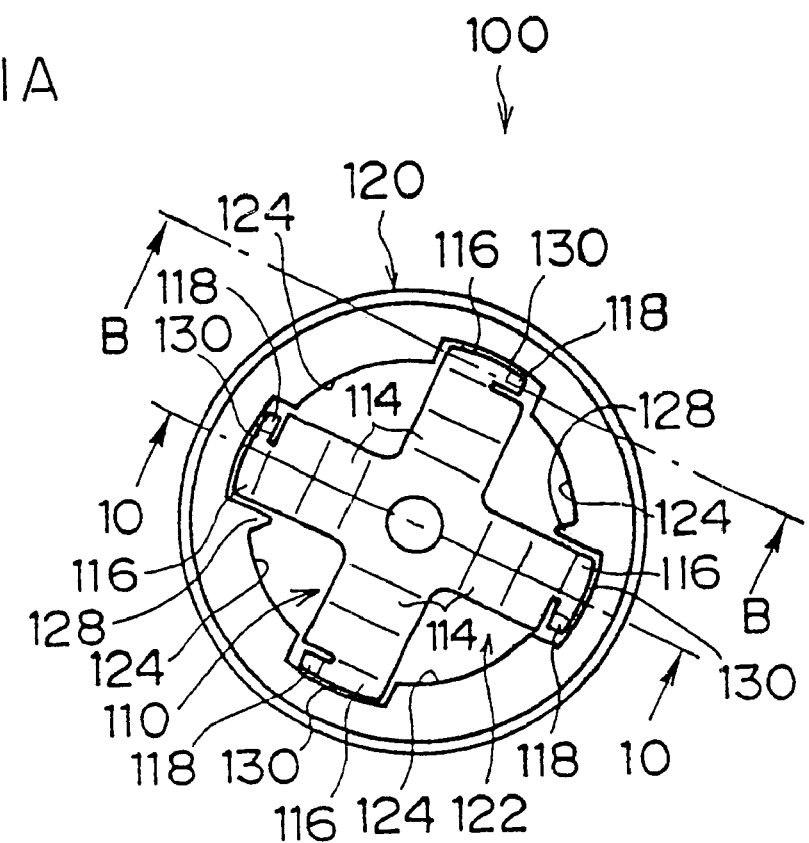
FIG. 11A is a plan view, as seen from the stay, at the time the stay is inserted into the base in the vehicle inner mirror assembly pertaining to the second embodiment of the present invention.
Figure 11B:
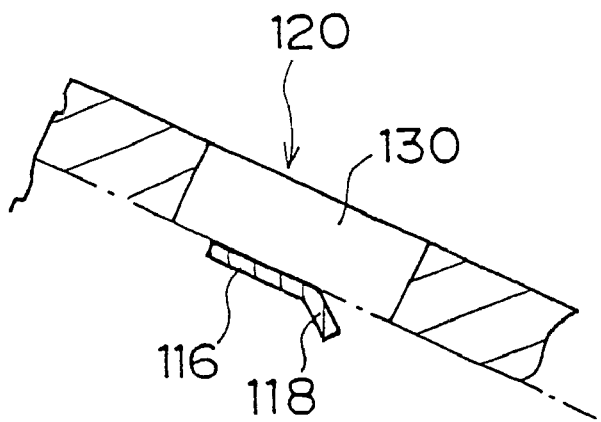
FIG. 11B is a cross-sectional view taken along line B—B of FIG. 11A.
Figure 12A:
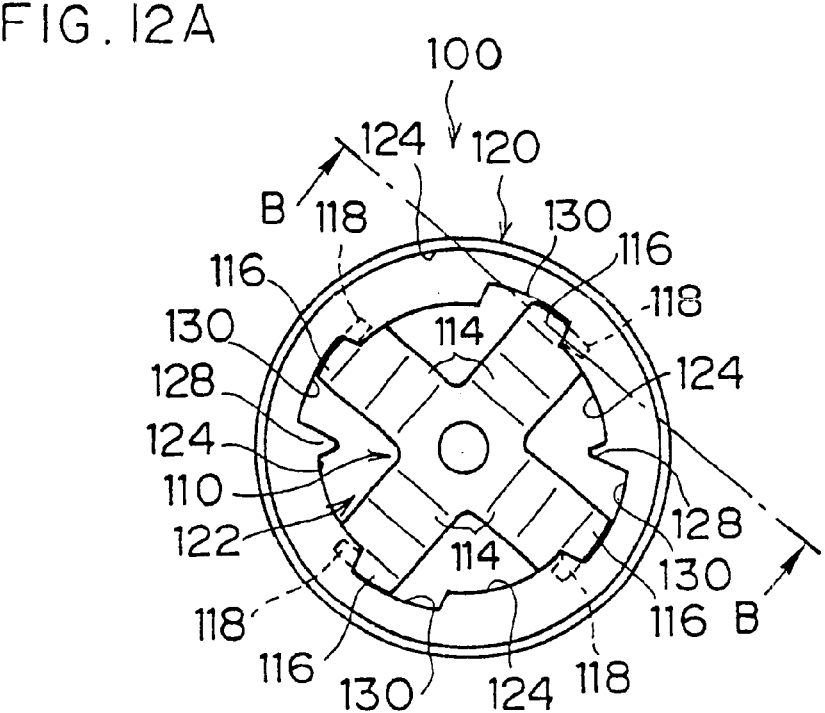
FIG. 12A is a plan view, as seen from the stay, at the time the stay is rotated with respect to the base in the vehicle inner mirror assembly pertaining to the second embodiment of the present invention.
Figure 12B:
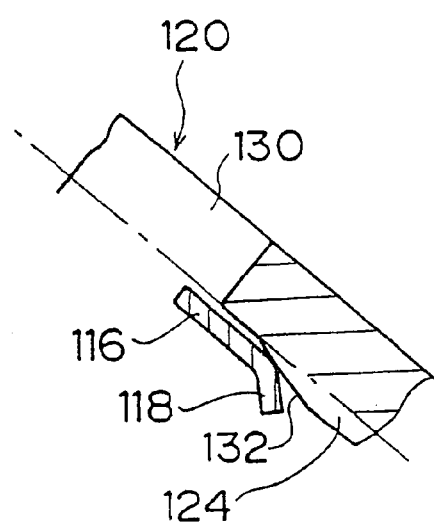
FIG. 12B is a cross-sectional view taken along line B—B of FIG. 12A.
Figure 13:
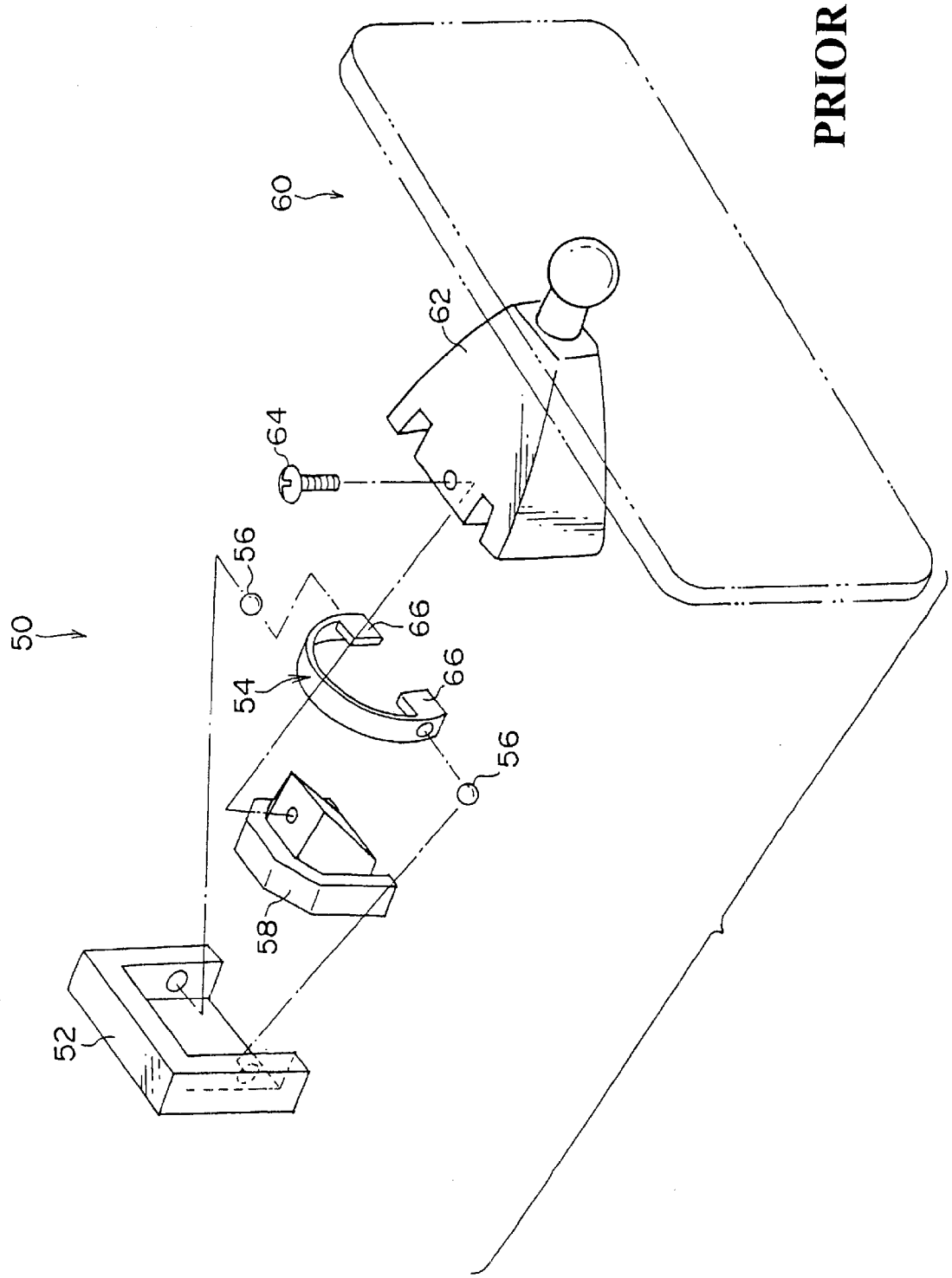
FIG. 13 is an exploded perspective view of a conventional vehicle inner mirror assembly.

An insertion hole 130 (four in the present embodiment) is formed at positions adjacent to the retention lugs 124 of the recess 122. Each insertion hole 130 accommodates a respective urging leg 114 of the spring 110. The urging legs 114 may be inserted as they are into respective insertion holes 130 in a natural state in which the urging force is not generated. Further, an inclined guiding portion 132 is formed between each insertion hole 130 and each retention lug 124 (i.e., each receiving portion 126). The inclined guiding portions 132 incline toward the receiving portions 126 of the retention lugs 124 from the insertion holes 130. As a result, as illustrated in FIGS. 10, 11A and 11B, after the urging legs 114 are inserted as they are into the insertion holes 130 in a natural state in which the urging force is not generated, as illustrated in FIGS. 12A and 12B, the stay 104 (i.e., the spring 110) is rotated with respect to the base 120, the contact portions 116 of the urging legs 114 are guided by the inclined guiding portions 132 and the guide tapers 118 so that they are slid as far as the receiving portions 126 of the retention lugs 124. The urging legs 114 are thereby elastically deformed (are pressured in the direction facing the base 120 from the stay 104) by the inclined guiding portions 132 and the guide tapers 118, so that the urging legs 114 engage (i.e., the contact portions 116 make surface contact with the receiving portions 126) with the retention lugs 124.

Here, when a load of predetermined value or greater acts upon the mirror 102, at least one of the urging legs 114 corresponding to the direction in which the load acts falls from the retention lug 124 of the base 120 and slides in the direction facing the stay 104 from the base 120. Accordingly, regardless of the direction in which the load acts, the mirror 102 (i.e., the stay 104) falls from the base 120.

Operation of the invention according to the present embodiment is hereinafter described.

In the vehicle inner mirror 100 having the structure described above, as illustrated in FIGS. 8, 9A and 9B, urging legs 114 of the spring 110 fixed to the stay 104 engage by an urging force with retention lugs 124 formed at the base 120.

Here, the receiving portions 126 formed on the retention lugs 124 corresponding to the contact portions 116 and the contact portions 116 provided on the urging legs 114 are substantially orthogonal to the direction facing the stay 104 from the base 120. The contact portions 116 make surface contact with the receiving portions 126. Accordingly, the stay 104 is urging by the urging force of the urging legs 114 toward the direction facing the base 120. Therefore, not only is the stay 104 (i.e., the mirror 102) held at the base 120 at a predetermined load, but the stay 104 is pressured to the base 120 whereby the capability to prevent chatter occurring between the stay 104 and the base 120 can be improved.

Further, because the substantially central portions of the urging legs 114 of the spring 110 are bent, the urging force of the urging legs 114 can be doubled in comparison to a case in which the central portions of the urging legs 114 are not bent. As a result, the force at which the stay 104 is held at the base 120 can be easily set for a predetermined load, the pressurizing force of the stay 104 toward the base 120 can be doubled, and the capability to prevent chatter from occurring between the stay 104 and the base 120 can be further improved. Further, because the proximal ends and substantially central portions of the urging legs 114 are bent, the space occupied by the urging legs 114 can be made smaller, and the base 120 and the stay 104 can be spatially economized.

Because four urging legs 114 are provided at the spring 110, the stay 104 is supported at the base 120 at four points. Accordingly, there is no need to increase the urging force of the urging legs 114 to the extent necessary with conventional plate springs in order to maintain the force at which the stay 104 is held at the base 120 for a predetermined load. Moreover, the bending of the urging legs 114 is not obstructed by other members. As a result, when a load of predetermined value or greater acts on the mirror 102, at least one of the urging legs 114 corresponding to the direction in which the load acts falls from the retention lugs 124 and slides in the direction facing the stay 104 from the base 120, whereby the engagement between all of the urging legs 114 and the retention lugs 124 is released. For this reason, regardless of the direction in which a load acts, the mirror 102 (i.e., the stay 104) is allowed to fall from the base 120.

Further, because the urging legs 114 are easily bent at a bending position thereof (i.e., the proximal ends and substantially central portions of the urging legs 114), the rear view mirror (i.e., the stay 104) is allowed to fall easily from the base 120.

Because the stoppers 128 provided at the ends of the retention lugs 124 prevent the urging legs 114 from sliding in the spring 110 circumferential direction, slipping of the urging legs 114 from the retention lugs 124 toward the insertion holes 130 (i.e., the spring 110 circumferential direction) so that the engagement of the urging legs 114 with the retention lugs 124 is needlessly released can be prevented. Consequently, when a load of predetermined value or greater acts on the mirror 102, falling of the mirror 102 (i.e., the stay 104) from the base 120 can be prevented.

Here, when the vehicle inner mirror assembly 100 is assembled, as illustrated in FIGS. 10, 11A and 11B, after the urging legs 114 are inserted as they are into the insertion holes 130 in a natural state in which the urging force is not generated, as illustrated in FIGS. 12A and 12B, the stay 104 (i.e., the spring 110) is rotated with respect to the base 120 and the contact portions 116 of the urging legs 114 are guided by the inclined guiding portions 132 and the guide tapers 118 and slid as far as the receiving portions 126 of the retention lugs 124. Consequently, the urging legs 114 are elastically deformed (pressured in the direction facing the base 120 from the stay 104) by the inclined guiding portions 132 and the guide tapers 118 so that the urging legs 114 engage with the retention lugs 124 (i.e., the contact portions 116 make surface contact with the receiving portions 126). Accordingly, the stay 104 can be held at the base 120.

Hence, because conventional balls and the base inner become unnecessary, the number of parts can be reduced, the need to align many parts by fastening a bolt is eliminated, assembly operations can be performed easily and assembly time can be reduced. Therefore, overall assembly can be improved and costs can be reduced.

Even when a procedure is not conducted in which the urging legs 114 are engaged with the retention lugs by manual operation in a state of elastic deformation, as described above, after the urging legs 114 are inserted as they are into the insertion holes 130 in a natural state in which the urging force is not generated, the contact portions 116 of the urging legs 114 can be engaged with the receiving portions 126 of the retention lugs 124 because the urging legs 114 are elastically deformed (i.e., pressured in the direction facing the base 120 from the stay 104) by the inclined guiding portions 132 and the guide tapers 118 by only rotating the stay 104 (i.e., the spring 110) with respect to the base 120. Because the urging legs 114 can be easily engaged with the retention lugs 124, assembly operations can be more easily performed, assembly time can be further reduced, overall assembly can be further improved and costs can be further reduced.

The inclined guiding portions 132 provided at the positions where the insertion holes 130 and the retention lugs 124 adjoin incline toward the receiving portions 126 of the retention lugs 124 from the insertion holes 130, and the guide tapers 118 provided at one side of spring 110 circumferential direction end portions of the urging legs 114 slant parallel to the direction facing the receiving portions 126 of the retention lugs 124 from the insertion holes 130. Therefore, engagement of the urging legs 114 with the retention lugs 124 is guided by the inclined guiding portions 132 and the guide taper portions 118. Accordingly, because the urging legs 114 can be easily engaged with the retention lugs 124, assembly operations can be performed even more easily, assembly time can be reduced even further, overall assembly can be improved even further and costs can be reduced even further.

Although the above embodiments describe structures in which four urging legs are provided at the spring, the present invention is not limited to the same. A structure in which three urging legs are provided at the spring is also possible.

Further, although structures have been described in which the bases are fixed within a passenger compartment to a front windshield, the present invention is not limited to the same. A structure in which the base is fixed to the ceiling of a passenger compartment of a vehicle is also possible.

What is claimed is:

1. A mirror assembly for fastening to the interior of a vehicle, the mirror assembly comprising:
   (a) a mirror;
   (b) a stay supporting the mirror;
   (c) a base fastenable to the interior of a vehicle, the base having at least three lugs; and
   (d) a retention member connected to the stay, the retention member having at least three legs engageable with the lugs of the base for detachably mounting the stay to the base and, wherein each of the legs includes a portion that is bent when no load is applied, and is resiliently deformable with respect to said bent portion to slidably disengage from a lug of said base.

2. The mirror assembly of claim 1, wherein the retention member includes a central portion which connects to the stay, and the retention member legs are provided at substantially equal intervals around the central portion.

3. The mirror assembly of claim 1, wherein the legs are resiliently deformable, and when the legs engage with the lugs, the lugs retain the legs resiliently deformed with the legs pressing against the lugs.

4. The mirror assembly of claim 3, wherein each leg substantially only contacts a corresponding lug along a line when the legs engage with the lugs.

5. The mirror assembly of claim 1, wherein the legs are bent.

6. The mirror assembly of claim 1, wherein the base includes an opening around which the lugs are provided in correspondence with the legs, the base including an insertion recess between each lug for inserting the legs when engaging the legs with the lugs.

7. The mirror assembly of claim 6, wherein the base includes inclined guiding portions for guiding the legs from the insertion recesses to the lugs.

8. The mirror assembly of claim 7, wherein the lugs include receiving portions that engage with the legs.

9. The mirror assembly of claim 8, wherein the legs include contact portions that contact the receiving portions of the lugs, and tapers formed generally parallel to the inclined guiding portions.

10. The mirror assembly of claim 9, wherein the base includes stoppers for preventing sliding of the legs in at least one direction, provided proximate the inclined guiding portions.

11. A mirror assembly for fastening to the interior of a vehicle, the mirror assembly comprsing:

(a) a rear view mirror;

(b) a stay provided at the mirror;

(c) a base fixable to the interior of a vehicle;

(d) retention lugs provided at the base; and (e) a retention member fixed to the stay, the retention member having at least three resiliently deformable legs, each leg extending at a substantially equal interval from around the retention member and being engageable with a corresponding lug, the legs being resiliently deformed and pressing against the lugs when engaged with the lugs for maintaining engagment therewith up to a load of a predetermined value.

12. The mirror assembly of claim 11, wherein each leg substantially only contacts a corresponding lug along a line, when the legs engage with the lugs.

13. The mirror assembly of claim 11, wherein the legs include contact portions substantially orthogonal to a direction facing the stay from the base, and the lugs include receiving portions corresponding to the contact portions, with the contact and receiving portions substantially orthogonal to a direction facing the base from the stay and pressing the stay to the base due to contact between the contact and receiving portions when the legs and legs are engaged with one another.

14. The mirror assembly of claim 11, wherein the legs are bent.

15. The mirror assembly of claim 11, wherein the base includes insertion recesses adjoining the lugs, with the insertion recesses enabling the legs to be inserted therein without significant deformation of the legs.

16. The mirror assembly of claim 15, wherein the base includes inclined guiding portions provided at positions where the lugs and insertion recesses adjoin, with the inclined guiding portions inclining towards the lugs from the insertion recesses.

17. The mirror assembly of claim 16, wherein the base includes a stopper provided at an end of each lug, with the stoppers preventing the legs from sliding in at least one direction.

18. The mirror assembly of claim 17, wherein the retention member includes a guide taper provided at an end of each leg, with each guide taper inclined therefrom.

* * * * *